(12) United States Patent
Alderman

(10) Patent No.: US 10,179,995 B2
(45) Date of Patent: Jan. 15, 2019

(54) REFLECTIVE TEMPERATURE MODULATING BLANKET

(71) Applicant: Robert Joe Alderman, Poteet, TX (US)

(72) Inventor: Robert Joe Alderman, Poteet, TX (US)

( * ) Notice: Subject to any disclaimer, the term of this patent is extended or adjusted under 35 U.S.C. 154(b) by 0 days.

(21) Appl. No.: 15/784,173

(22) Filed: Oct. 15, 2017

(65) Prior Publication Data

US 2018/0355606 A1 Dec. 13, 2018

Related U.S. Application Data

(60) Provisional application No. 62/603,735, filed on Jun. 12, 2017, provisional application No. 62/605,155, filed on Aug. 3, 2017.

(51) Int. Cl.
*E04B 1/74* (2006.01)
*E04B 1/78* (2006.01)
*F28D 20/02* (2006.01)
*F16L 59/08* (2006.01)
(Continued)

(52) U.S. Cl.
CPC ............... *E04B 1/78* (2013.01); *F16L 59/08* (2013.01); *F28D 20/025* (2013.01); *F28D 20/028* (2013.01); *E04B 2001/742* (2013.01); *E04B 2001/7679* (2013.01); *E04D 13/174* (2013.01); *E04D 13/178* (2013.01)

(58) Field of Classification Search
CPC ............... E04B 1/78; E04B 2001/7679; E04B 2001/742; F16L 59/08; F28D 20/025; F28D 20/028; E04D 13/174; E04D 13/178

See application file for complete search history.

(56) References Cited

U.S. PATENT DOCUMENTS 4,962,692 A * 10/1990 Shuert ................... E04D 13/174
454/365
5,290,904 A * 3/1994 Colvin .................... B32B 27/06
428/68
5,626,936 A 5/1997 Alderman
(Continued)

OTHER PUBLICATIONS

Alderman, RJ, Yarbrough DW (2007) Use of Phase-Change Materials to Enhance the Thermal Performance of Building Insulations In: Proceedings on the International Thermal Conductivity Conference, ITCC 29 and ITES 17 Conference, Birmingham, Al, Jun. 24-27.

*Primary Examiner* — Patrick J Maestri
(74) *Attorney, Agent, or Firm* — Law Office of William F. Ryann

(57) ABSTRACT

A temperature modulating blanket utilizing a reflective surface to block radiation away from a phase change material during daylight and in thermal conductivity with the material to allow heat conduction out of the material at night at a faster rate than it is absorbed during the daylight. The blanket may be well suited for modulating temperatures of storage and other facilities. Additionally, the facilities may be uniquely configured to promote an attic circulation that further facilitates freezing and recharge of the phase change material of the blanket during night hours. For example, a secondary blanket utilizing a phase change material of a higher melting point may be placed at an elevated vent of a roof defining the attic to encourage such circulating and blanket recharge.

12 Claims, 5 Drawing Sheets

(51) Int. Cl.
  *E04D 13/17*  (2006.01)
  *E04B 1/76*  (2006.01)

(56) References Cited

U.S. PATENT DOCUMENTS

| | | |
|---|---|---|
| 5,770,295 A | 6/1998 | Alderman |
| 6,645,598 B2 | 11/2003 | Alderman |
| 7,641,812 B2 | 1/2010 | Alderman |
| 7,703,254 B2 | 4/2010 | Alderman |
| 7,704,584 B2 | 4/2010 | Alderman |
| 8,156,703 B2 | 4/2012 | Alderman |
| 9,499,986 B2 * | 11/2016 | Kalkanoglu .............. E04D 1/30 |

* cited by examiner

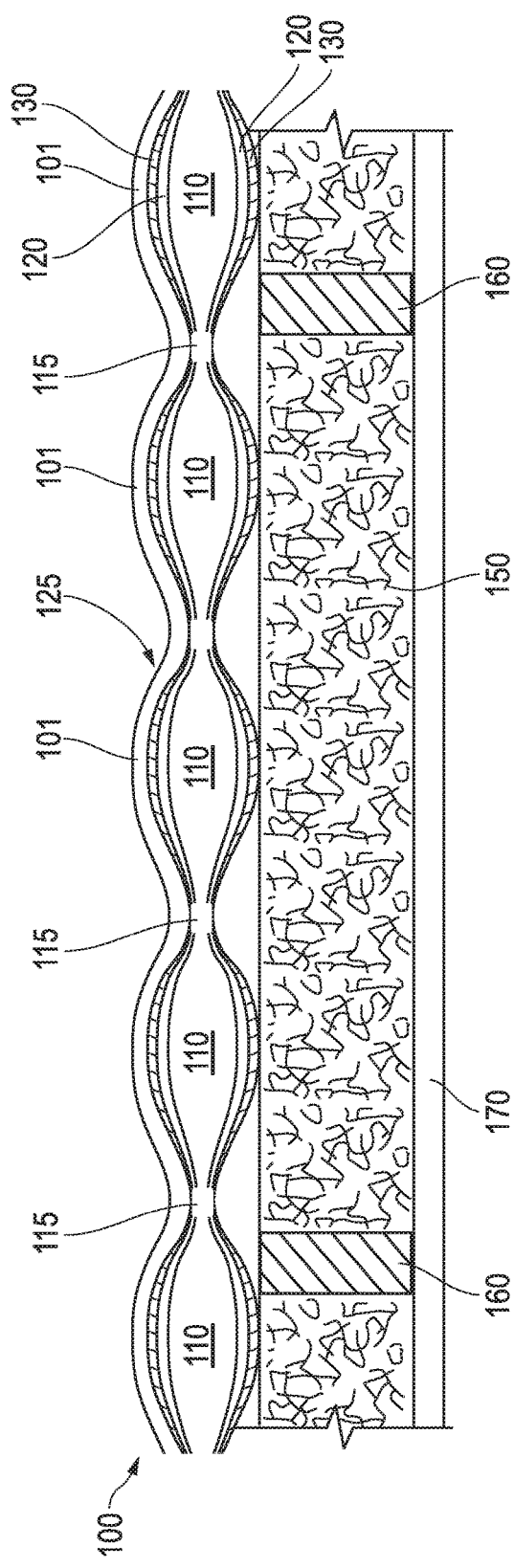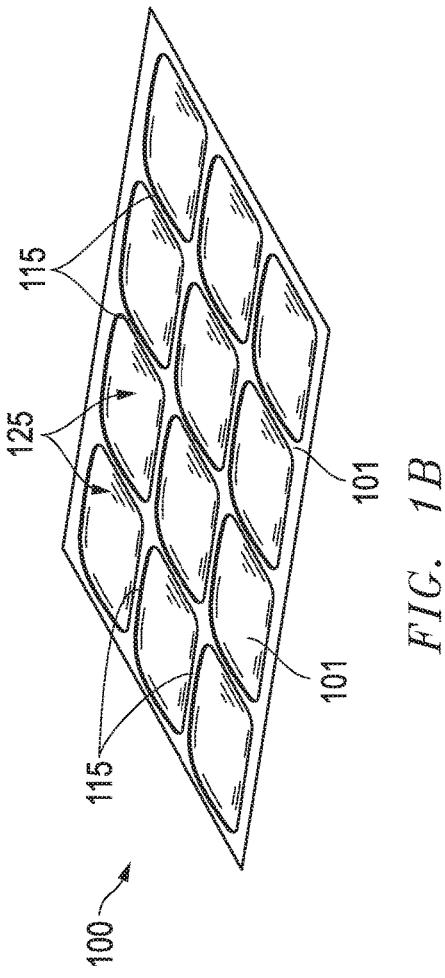

REFLECTIVE TEMPERATURE MODULATING BLANKET

PRIORITY CLAIM/CROSS REFERENCE TO RELATED APPLICATION(S)

This Patent Document claims priority under 35 U.S.C. § 119 to U.S. Provisional App. Ser. No. 62/603,735, filed Jun. 12, 2017, and entitled, "Self-Storage Phase Change Comfort Control", and under 35 U.S.C. § 119 to U.S. Provisional App. Ser. No. 62/605,155, filed Aug. 3, 2017, and entitled, "Self-Service Storage with Phase Change Materials", each of which is incorporated herein by reference in its entirety.

BACKGROUND

Storage units, garages, aircraft hangars, warehouses, portions of data centers and a host of other facilities that are used more so for housing goods and equipment than for human activity are often left without any climate control capabilities. That is, as a matter of economic practicality, there is generally no need to outfit a storage unit for housing folding chairs and tables with air conditioning. Rather, the labor and expense of installing and running such equipment can often be completely avoided depending on the types of goods and equipment that are to be housed by the facility.

In many cases, however, the goods and equipment that are to be housed may require a degree of climate control. For example, climate control storage units are often preferred for goods such as electronic storage media, film, photographs, musical instruments, medication, cosmetics, items of leather, art, antiques and other articles that the owner may be concerned about being damaged by excessive temperatures.

Generally speaking, the term "climate control", at least as applied to storage units, does not mean that the climate controlled storage unit will be kept consistently at a predetermined temperature. That is, instead of setting a thermostat of the facility at 75°, a much wider range of temperatures is utilized. For example, a range of between about 55° and 85° may be maintained with heating not being applied until temperatures fall below 55° and air conditioning remaining off until the temperature in the facility goes above 85°. In this way, the operator of the facility incurs the expense of equipment installation and maintenance. However, the expense of actually operating the equipment may be kept to a minimum. Indeed, depending on the area of the country and time of year, the equipment may be off throughout the majority of each day's diurnal cycle.

In spite of the likely cost savings to operators from utilizing such a wide range of climate control, customers generally do not feel the same degree of economic benefit. Rather, depending on the particular region and market, climate controlled storage units may rent at a price of between 50% to 100% or more per square foot than corresponding storage units that lack climate control. Of course, this far exceeds the added cost to the operator of providing the climate control.

In order to avoid these added climate control expenses, customers and competing non-climate control storage facilities often undertake alternative efforts to minimize the degree of temperature extremes to which stored goods may be exposed. For example, wood pallets may be placed on the floor to keep goods from constant contact with a concrete floor of the unit. Added care may be taken to ensure weather stripping around doors is not cracked. Additionally, radiant foil-type barriers may be secured to the ceilings of the units to reflect infrared light away. In fact, operators may even go so far as to install a suspended ceiling at a location below the radiant barrier to accommodate insulation, creating an attic space similar to that found in structures meant for human habitation.

Unfortunately, in spite of all of these efforts, there is no practical way to ensure that a non-climate controlled facility will perform as effectively as a climate controlled facility on a day by day basis. By way of specific example, at some point in the summer, in the southern part of the United States, candles stored in a non-climate controlled facility lacking air conditioning will melt no matter how much climate related retrofitting efforts have been undertaken. Without air conditioning, the unit will exceed 85°.

SUMMARY

A multilayered blanket or sheet is provided that may be used to uniquely modulate temperatures in a facility. The blanket includes a layered assembly housing a phase change material with a predetermined melting point that is tailored to the environment. A reflective material layer is included that is in conductive thermal communication with the phase change material to substantially reflect radiation away from the phase change material and to facilitate heat conduction out of the phase change material.

BRIEF DESCRIPTION OF THE DRAWINGS

Implementations of various structure and techniques will hereafter be described with reference to the accompanying drawings. It should be understood, however, that these drawings are illustrative and not meant to limit the scope of claimed embodiments.

FIG. 1A is a side cross-sectional view of an embodiment of a reflective temperature modulating blanket installed at a ceiling of a structural facility.

FIG. 1B is a perspective view of the reflective temperature modulating blanket prior to installation.

DETAILED DESCRIPTION

Figure 2A:
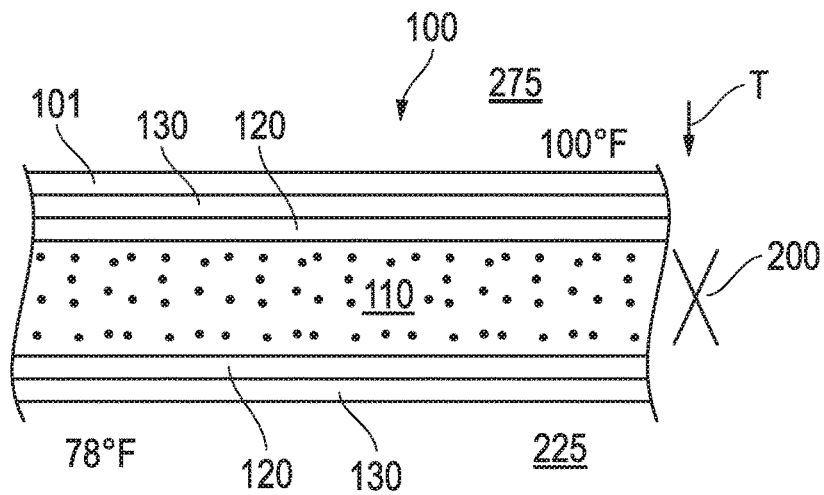
FIG. 2A is a schematic cross-section of the temperature modulating blanket of FIG. 1B exposed to outside temperatures above a melting point of phase change material in the blanket.

Embodiments are described with reference to the use of a reflective temperature modulating blanket in certain types of structural facilities. Specifically, a storage unit lacking full HVAC capacity is retrofitted with a suspended ceiling accommodating a reflective temperature modulating blanket. However, a variety of other facility types may take advantage of embodiments of a blanket as detailed herein.

This may even include utilizing such a blanket in fully HVAC equipped facilities or incorporating such blankets in walls and other locations throughout facilities, not limited to ceiling-type areas. So long as a reflective material layer is provided that is in conductive thermal communication with the phase change material of the blanket, appreciable benefit may be realized. This, along with other features detailed herein provide a blanket that loses heat faster during cooler night hours than it gains during hotter daylight hours thereby extending and enhancing its temperature modulating capabilities. As used herein, the term "blanket" is not meant to infer any particular shape or structural arrangement. Indeed, any device, assembly or structure that incorporates phase change material may be considered a "blanket" as the term is used herein.

Referring now to FIG. 1A, a side cross-sectional view of an embodiment of a reflective temperature modulating blanket 100 installed at a ceiling 170 of a structural facility is shown. In the embodiment shown, individual pods 125 of phase change material (PCM) 110 are provided between seams 115. The particular PCM 110 displays characteristics similar to ice at between about 78°–82° F. That is to say, the PCM 110 may be referred to as having a melting point of about 78° F. However, it should be noted that, just as with water-based ice, the melting or freezing of the PCM 110 is transitional and may occur over a given limited range of temperature, depending on factors such as purity, rate of heat transfer, etc. So, for example, as used herein, noting that the PCM 110 has a particular freezing or melting point (e.g. 78° F.) is not meant to infer that the PCM 110 wouldn't start to freeze at 79° F. or start to melt at 77° F., but rather that at 78° F., some transitional effects might be expected. Furthermore, while 78° F. is referenced herein as the exemplary melting point for the PCM 110, it should be noted that alternative material choices for the PCM 110 may be utilized that would result in a melting point of substantially greater than or less than 78° F. The particular melting point for the selected PCM 110 may be tailored to the environment in which the blanket 100 is to be utilized and/or the range of temperature that is desired within the structural facility as discussed further below.

Continuing with reference to FIG. 1A, in the embodiment shown, the PCM 110 may be calcium chloride hexahydrate, sodium sulfate, paraffin, coconut oil or a variety of other materials selected that would display a predetermined melting point such as 78° F. Such materials may be described in greater detail within U.S. Pat. Nos. 5,626,936, 5,770,295, 6,645,598, 7,641,812, 7,703,254, 7,704,584 and 8,156,703, each of which are incorporated by reference herein in their entireties. Regardless of the particular material selected for the PCM 110, it may act like a solar collector, absorbing heat from the outside environment as it transitions from a "frozen" state to a liquid state as temperatures reach and exceed 78° F., in the example noted.

With specific reference to the embodiment depicted in FIG. 1A, consider the circumstance of the outside environment above the blanket 100 progressively getting warmer as a typical summer day progresses. The 78° F. (or cooler) frozen PCM 110 may begin to absorb the heat of the day once this heat exceeds 78° F. and transition to a liquid over the course of the day. However, due to this extended transition period, the heat moving from the region above the blanket 100 toward the interior of the structural facility below the blanket 100 and ceiling 170 is halted. That is, the heat is effectively unable to progress beyond the blanket 100 until the PCM 110 has melted.

Over the course of a given diurnal cycle, nightly freezing followed by daily melting of the PCM 110 is readily understood. For example, in the southern U.S., a PCM 110 with a melting point of 78° F. would be expected to face heat during summer days substantially in excess of 78° F. which would begin to melt the PCM 110. In fact, in the embodiment shown, during the day attic temperatures above the blanket and insulation 150 would be expected to exceed outside temperatures. For example, with an outside temperature of 100° F., it would not be unexpected to see a 120° F. attic temperature adjacently above the blanket 100.

Recall that the PCM 110 may be used to halt the transfer of heat, for example, from the attic above, to the interior of the facility below, so long as it is able to absorb the heat in transitioning from solid to liquid form. Thus, in an effort to extend the time-frame of this transition so as to protect the interior of the facility from heat transfer for as long as possible, a unique reflective layer 101 is provided at the outer surface of the blanket 100. The reflective layer 101 may be a conventional aluminum foil, biaxially-oriented polyethylene terephthalatemylar or other metalized polyester that serves as a barrier to minimize moisture and block thermal radiation. That is, while heat may still travel through thermal conduction and convection, the presence of the reflective layer 101 substantially eliminates thermal radiation as a means of heating the PCM 110. Therefore, even in the face of adjacent extreme temperatures, the rate of melt to the PCM 110 may be minimized, thereby protecting the underlying space from heat transfer for the substantial portion of the day. Indeed, the odds of temperatures exceeding an acceptable comparable climate control high of 85° F. during any given summer day may be negligible, even in the southern U.S.

Additionally, in sharp contrast to conventional radiant barriers that utilize an adjacent airspace to avoid conduction, the reflective layer 101 of the blanket 100 is in conductive thermal communication with the underlying PCM 110 to ensure thermal conduction therewith. The layer 101 is not stapled to the roof of the attic nor provided with a small airspace to keep an insulating distance from the PCM 110. To the contrary, as detailed further below in the discussion of FIGS. 2A and 2B, a substantially air-free conductive thermal communication with the PCM 110 allows for a more timely freezing of the PCM 110, for example, at night when temperature flow is in the opposite direction (e.g. out of the PCM 110 and into the cooler adjacent attic).

Continuing with reference to FIG. 1A, the unique reflective temperature modulating blanket 100 is positioned in a facility above conventional fiberglass insulation 150. A ceiling 170 and conventional joists 160 help define the area around the insulation 150 and the blanket 100. However, it is worth noting that the blanket 100 is not itself insulation. That is, as opposed to slowing the rate of heat transfer to within the facility in the example noted above, heat transfer to the interior is halted for as long as the PCM 110 is able to absorb heat. During the day, where the consideration of heat transfer is downward, from the attic toward the blanket 100, an expected resistance (R) of about 9 might be expected. This helpful fact, along with the addition of the reflective layer 101 and a thickness of up to about ¼ inch, the PCM 110 should substantially avoid complete melt of the PCM 110 for any typical day, again, even in the southern U.S. in the summer.

Referring now to FIG. 1B with added reference to FIG. 1A, the blanket 100 is shown divided into an array of pods 125 that are segregated by seams 115. From a manufacturing and user friendliness standpoint, an array of pods 125 containing PCM 110 provides a practical way of handling the blanket 100 as opposed to say a multilayered structure lacking seam 115 support. Also, recall that the blanket 100 functions differently than insulation. That is, the temperature of the blanket 100 acts to absorb heat as described above. Thus, seams 115 lacking PCM 110 do not compromise the overall effectiveness of the blanket 100 in modulating temperature. In fact, recall that the outer reflective layer 101 is in conductive thermal communication with the underlying PCM 110. Apart from other unique advantages, this temperature conduction capability further ensures that temperatures across the blanket 100 may be substantially uniform and distributed even though some locations include PCM 110 (e.g. 125) and others do not (e.g. 115).

While the reflective layer 101 is in conductive thermal communication with the PCM 110 of each pod 125, it may not necessarily be in direct contact with the material 110. For example, in the embodiment shown, different polymer layers 120, 130 may be utilized. Using these layers 120, 130 may serve as an aid to effectively sealing and forming the seams 115 during manufacture (e.g. see FIG. 4). Nevertheless, at the reflective layer 101 side of the blanket 100, the reflective layer is kept in substantially direct uniform contact with the adjacent polymer layer 130 which is in direct contact with the next layer 120 about the PCM 110. Thus, the reflective layer 101 is effectively in thermally conductive thermal communication with the PCM 110.

Referring now to FIG. 2A, a schematic cross-section of the temperature modulating blanket 100 of FIG. 1B is shown. In this depiction, the blanket 100 is exposed to outside temperatures above a melting point of the PCM 110. So, for example, as alluded to above, a scenario may emerge where daytime temperatures reach 100° F. which results in 120° F. or more adjacent the blanket 100 (e.g. in an upper attic-type space 275). Thus, heat flow, represented by (T) would tend to move in the downward direction of the arrow depicted. However, in doing so, the flow encounters obstacles presented by the blanket 100 and other factors. For example, even in absence of PCM 110, the downward flow of heat toward a surface may result in a stratification of air with an inherent resistance (or R value) of 8-10. Furthermore, the presence of the outer reflective layer 101 of the blanket 100 substantially eliminates the flow of radiant heat as described above. Finally, what heat does make it to the PCM 110 is halted (e.g. see 200) (as it is absorbed throughout the day while the PCM 110 slowly transitions from solid-form to liquid).

In addition to the resistance to flow into the PCM 110 at the location of the reflective layer 101 during warmer periods of the day, the R value reduces to about 2 during cooler periods of the evening as described below. That is, the same location of the attic space 225 at the reflective layer 101 displays two different advantageous R values depending on circumstances. Specifically, a high R value and slower rate of heat into the PCM 110 during warmer day periods and a lower R value and more rapid rate of PCM 110 cooling during cooler night periods.

Continuing with specific reference to Fi. 2A, only at the point of complete liquification of the PCM 110 is the heat able to continue downward and fully cross the blanket 100 to the adjacent storage space below 225. As used herein, the term "storage space" is not meant to infer that the space must be used only for storage purposes. The space 225 may be for any number of purposes including storage or habitation or a variety of other purposes. Similarly, the term "adjacent" is not necessarily meant to infer immediately adjacent. These terms are only meant as a distinction from the attic space 275 at the opposite side of the ceiling 170 and blanket 100. Regardless, notice that in the example depicted at FIG. 2A, this space below 225 is at about 78° F., at least at the outset of the day. This means that for the heat to continue passing through to this space 225 beyond the blanket 100, temperatures at the opposite side of the blanket 100, which had initially been at 120° F., would still need to be above 78° F. Otherwise, there would be no thermal dynamic in the direction of the space below 225. As a practical matter, this means that the blanket 100 may be configured with a thickness or volume of PCM 110, choice of PCM material characteristics, and other specifications tailored to to account for expected high temperatures on a given summer day, for example, depending on where the blanket 100 is to be utilized (e.g. Arizona vs. Maine). As a result, the blanket 100 may modulate or maintain a stable temperature in the space below 225 throughout the day.

Figure 2B:
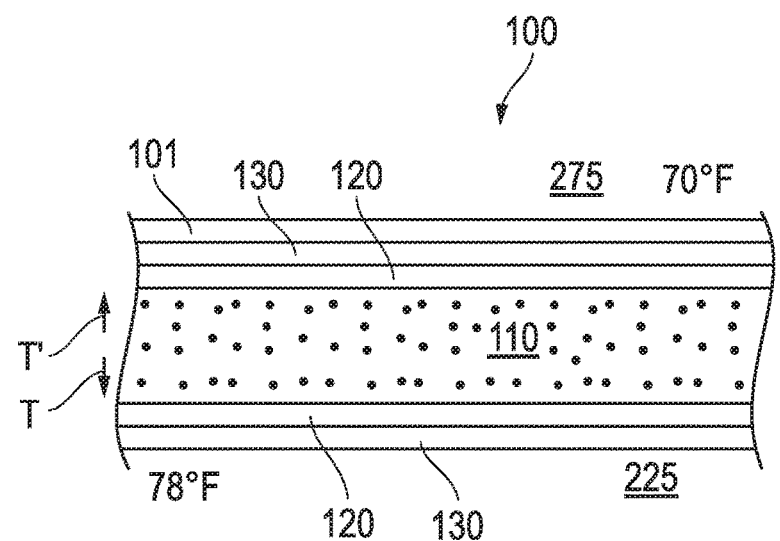
FIG. 2B is a schematic cross-section of the temperature modulating blanket of FIG. 2A exposed to outside temperatures below a melting point of the phase change material.

Referring now to FIG. 2B, a schematic cross-section of the temperature modulating blanket 100 of FIG. 2A is shown exposed to external temperatures that are below a melting point of the PCM 110. For example, as shown, the attic space 275 temperature is cooling down at the end of the day and is now below the 78° F. melting/freezing point temperature of the PCM 110 (e.g. at 70° F.). The dramatic drop in temperature within the attic space 275 is understandable given the ease with which the higher heat is able to move upward in a turbulent fashion toward the cooler air outside of the facility. The change to an upward flow also means that the resistance (R) is likely closer to a value of 2. In fact, as discussed further in embodiments below, the architecture of the facility may be modified to further encourage attic cooling in this manner with another PCM blanket 350 (see FIG. 3B).

Regardless, as shown in FIG. 2B, with the cooled attic space 275 at 70° F. adjacent the PCM 110 which has been heated to or beyond its 78° F. melting point, an upward heat flow (T) out of the PCM 110 and toward the attic space 275 may take place. In this fashion, the PCM 110 begins to cool, freeze and recharge for the next day. Furthermore, as detailed above, the reflective layer 101 of the blanket 100 is in thermally conductive communication with the PCM 110. Thus, the rate of heat transfer from within the PCM 110 toward the attic space 275 may be further enhanced. As a result, significant assistance to the complete freeze and recharge of the PCM 110 is provided over a given nighttime period.

By the same token, in the example shown, the adjacent space below 225 is shown as still roughly maintaining its 78° F. temperature. In circumstances where the PCM 110 was heated beyond its melting point, this would mean that some degree of heat would also flow out of the comparatively warmer PCM 110 and into this space 225 (see the downward flow T). Of course, there is the possibility that the temperature in this space 225 rose a little as the day progressed and the PCM 110 fully melted prior to the emergence of the cooler outside air. So, consider the scenario where the temperature in the space 225 rose to 80° F. by the end of the day and the PCM 110 is liquid and at about 79° F. In this scenario, heat may actually rise from the space 225 and toward the PCM 110. The flow may be somewhat impeded due to stratification and a higher R value (again, perhaps about 9). However, at some point, the excess heat into the PCM 110 from this space 225 would continue to flow out of the PCM 110 (e.g. T'). This outward flow would continue to be further allowed by the reflective layer 101 as described above with heat leaving the PCM 110 at a faster rate during night allowing the PCM 110 to freeze and recharge as the adjacent space below 225 also cooled.

Figure 3A:
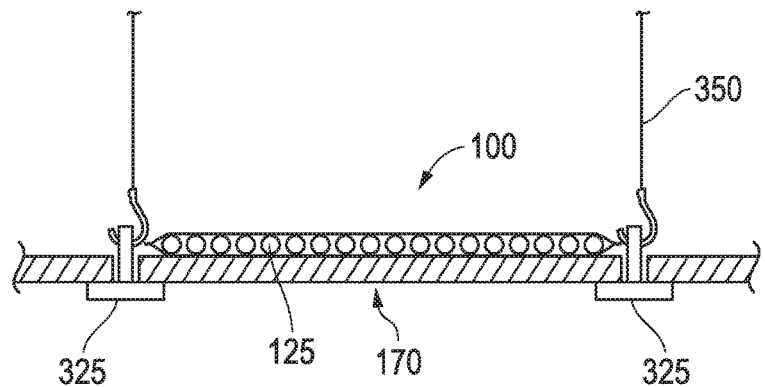
FIG. 3A is a side cross-sectional view of an embodiment a suspended ceiling accommodating the reflective temperature modulating blanket thereat.

Referring now to FIG. 3A, a side cross-sectional view of an embodiment a suspended ceiling 170 is shown. The ceiling 170 may consist of tiles configured to support an array of reflective temperature modulating blankets 100 such as the embodiment detailed above. In the embodiment shown, tiles forming the ceiling 170 are supported by T-bars 325 that are secured to the underside of a roof 380 of a structural facility 300 with cables 350 (see FIG. 3B).

Figure 3B:
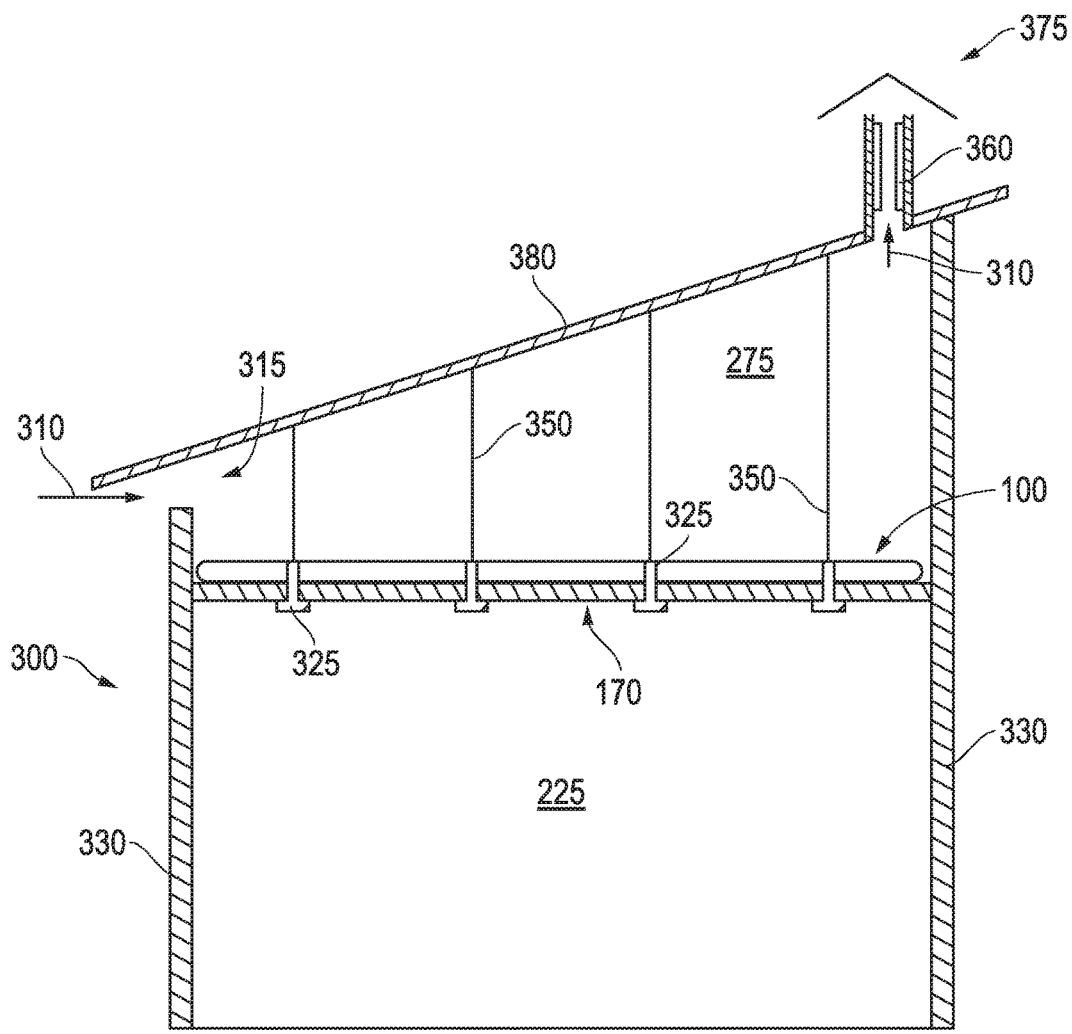
FIG. 3B is a cross-sectional view of a structural facility accommodating the suspended ceiling of FIG. 3A with reflective temperature modulating blanket.

Referring now to FIG. 3B, a cross-sectional view of a structural facility 300 is shown accommodating the suspended ceiling 170 of FIG. 3A. Walls 330 of the facility 300 may or may not be outfitted with additional temperature modulating blankets, with or without reflective layers as described herein to further aid in modulating facility temperatures. Regardless, as shown, the ceiling 170 and accommodated blankets 100 help define the adjacent space 225 and the attic space 275 which, over a given diurnal cycle, may experience heat flows and temperature cycles similar to that detailed above in the discussion regarding FIGS. 1 and 2. However, in addition to modulating temperature as detailed above, further enhancements to this modulating may be provided as described below.

Continuing with reference to FIG. 3B, the attic space 275 of the facility 300 may be further defined by a roof 380 that includes circulation openings 315, 375. More specifically, a lower elevation vent 315 or soffit is provided along with a higher elevation vent 375 in the form of a stack vent, although a ridge vent or other vent type may be utilized. Regardless, with this architecture defining the attic space 275 a flow of air 310 into and out of the attic space may be facilitated. So, for example, consider the attic space 275 of FIG. 2B, having been heated over the course of a day's worth of exposure to hot the summer sun. As outside air temperatures become cooler than the attic space 275, there would be a natural tendency for the heat in the attic space 275 to rise and circulate out with the air 310 through the stack vent 375, particularly where aided by another PCM blanket 360 as described below. As a part of this circulation, cooler air from the outside would also be coming in through the discrete, separately located, lower elevation vent 315, accommodating comparatively less PCM than the blanket 360 or the higher elevation vent 375. Indeed, in the embodiment shown, this vent 315 is free of such a blanket altogether. Therefore, the rate of cooling of the heated attic space 275 would be enhanced. Ultimately, with added reference to FIG. 2B, this would also increase the rate of freezing of the PCM 110 of each blanket 100. Thus, not only does the reflective layer 101 delay the melting process during the day and increase the rate of freeze during the evening but the freezing is also further aided by the architecture and circulation of the attic space 275 itself.

Once more, in the embodiment shown, the stack vent 375 is lined with another temperature modulating blanket 360. With or without a reflective layer 101 as discussed above, this blanket 360, as with the blanket 100 at the ceiling 170, would also continue to release heat therefrom which had been absorbed during the day. Indeed, in the case of the stack vent blanket 360, the stack vent 375 may be painted black, or otherwise of a darkened character, to ensure sufficient absorption of heat by the blanket 360 during the day. Once more, a phase change material may be utilized in this blanket 360 which has a substantially higher melting point than that of the PCM 110 in the blanket 100 at the ceiling 170. For example, the PCM 110 may be at about 78° F. as noted whereas the material of the stack vent blanket 360 may have a melting point in excess of 100° F.

The subsequent release of this heat from the stack vent blanket 360 in the evening would further promote continuation of the circulation. Thus, in the evening, even as the attic space 275 cools circulation of the heat flow out of the attic space 275 may be continued. Again, this continued circulating convection would further enhance the rate of freeze and recharge for the reflective temperature modulating blanket 100, thereby further assuring temperature modulating capability for the next day.

Figure 4:
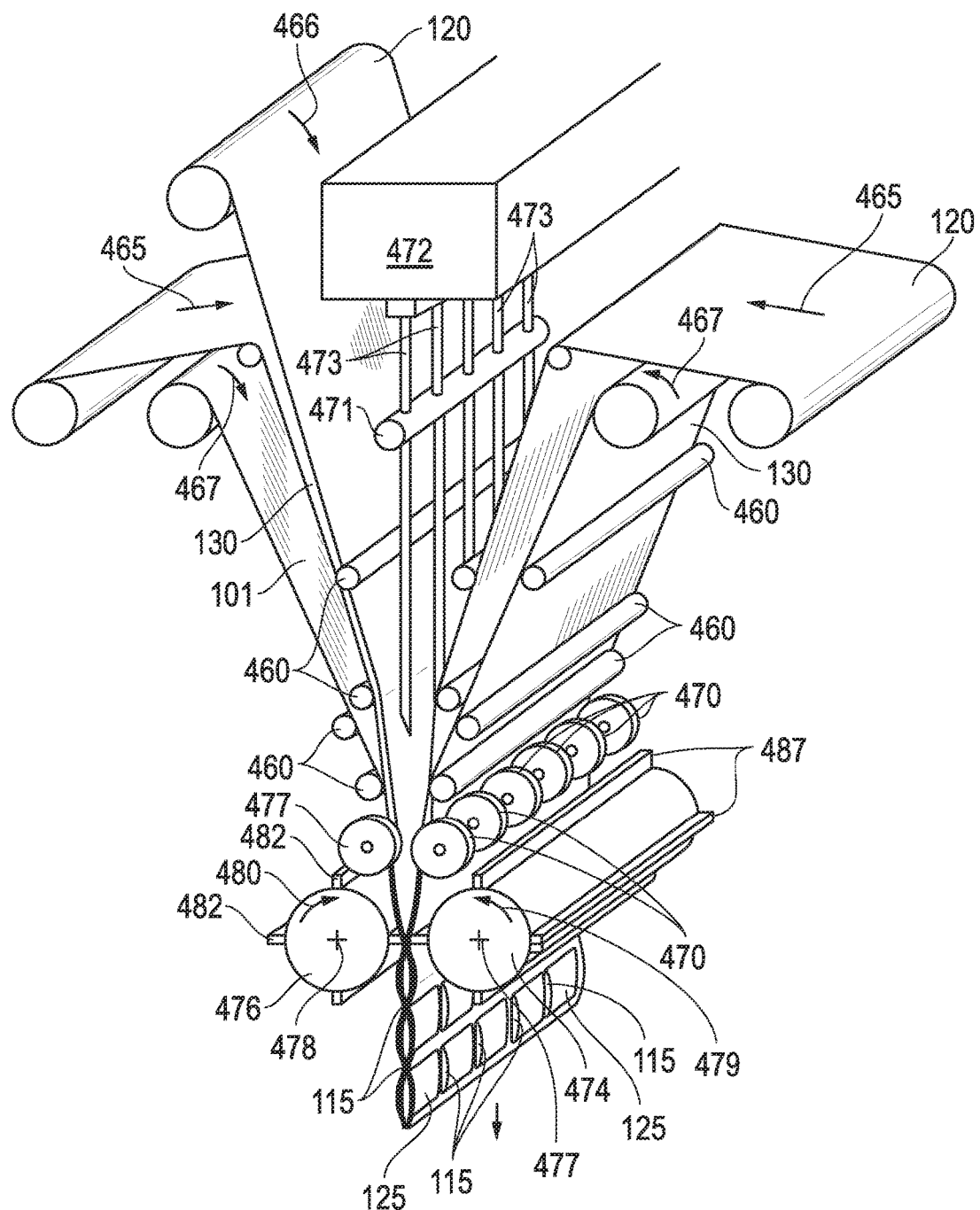
FIG. 4 is a perspective view of an embodiment of a manufacturing equipment for the reflective temperature modulating blanket.

Referring now to FIG. 4, a perspective view of an embodiment of a manufacturing equipment for the reflective temperature modulating blanket is shown. FIG. 4 illustrates a process by which the blanket 100 of FIGS. 1A-3B may be produced. As shown, multiple sheets or polymer layer plies 120, 130 are fed from their supplies from opposite sides and advanced along a processing path in a downward direction as indicated by arrows 465-467. Furthermore, at one side, an additional ply of a reflective layer 101 is incorporated into the process. Various guide rolls 460 guide the plies 120, 130, 101 until they pass in superposed relationship between opposed gangs of longitudinal heated sealing wheels 470, 471. The sets of wheels 470, 471 are urged toward one another, with the plies 120, 130, 101 passing there between. As the wheels 470, 471 make contact with the plies 120, 130, 101, at least the polymer plies 120, 130 fuse, forming seams 115. This effects the formation of pockets which ultimately help to define the pods 125.

In the meantime, laterally extending sealing drums 474 and 476 are rotatable about their laterally extending axes 477 and 478 in the directions as indicated by arrows 479 and 480, and the laterally extending ribs 481 of the sealing drum 474 register with the laterally extending ribs 482 of the sealing drum 476. The sealing drums 474 and 476 are heated, and their ribs 482 are heated, to a temperature that causes at least the polymer plies 120, 130 advancing along the processing path to fuse in response to the contact of the ribs 481 and 482. In this manner, lateral seams 115 are formed in the superposed sheets, closing the pods with PCM 110 therein as discussed further below (see also FIG. 1A).

With added reference to FIG. 1A, the center of the formed pods 125 are filled with PCM 110, such as calcium chloride hexahydrate, sodium sulfate, paraffin, $NaA_2SO_4.10H_2O$, $CACl_26H_2O$, $Na_2S_2O_3.5H_2O$, $NaCO_3.10H_2O$, $NaHPO_4.12H_2O$ or a variety of other materials having melting/freezing points of somewhere between about 60° F. and 85° F. Regardless, as shown in FIG. 4, these materials may be stored in a material housing 472 and metered out during the above described pod forming process. More specifically, tubular dispensers 473 from the housing 472 may be used to deliver a predetermined amount of PCM 110 to each pod in between each sealing closure with the ribs 482 which closes off each pod 125. While FIG. 4 shows an example of the possible apparatus that can be used to produce the blanket 100 of FIG. 1A, other conventional filling devices may be used as may be convenient and appropriate.

Figure 5:
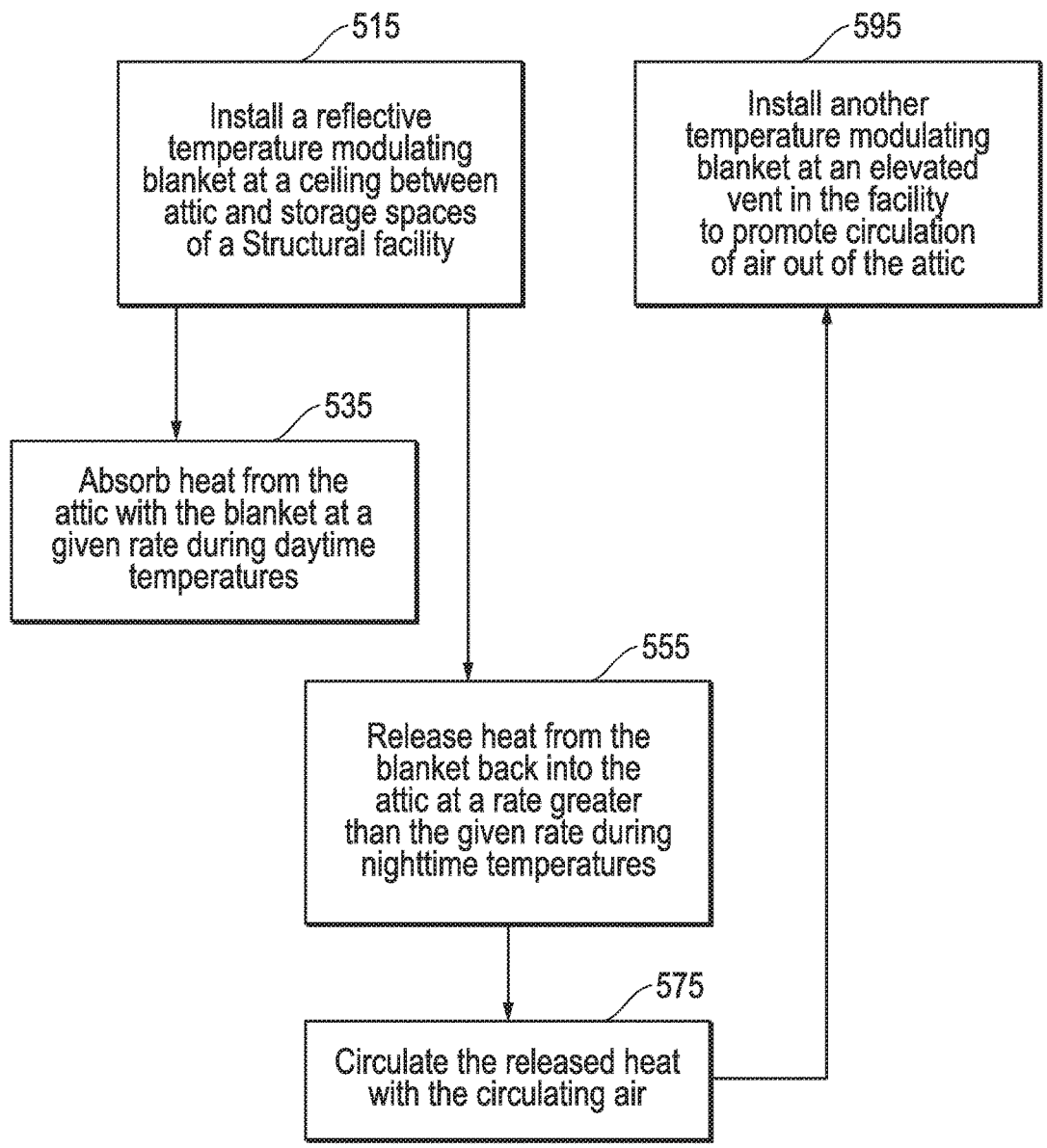
FIG. 5 is a flow-chart summarizing an embodiment of utilizing a reflective temperature modulating blanket in a structural facility.

Referring now to FIG. 5, a flow-chart is shown summarizing an embodiment of utilizing a reflective temperature modulating blanket in a structural facility. As indicated at 515, the blanket is installed at a ceiling of the facility between the attic and storage spaces. Thus, as indicated at 535 it may begin to absorb heat from the attic at a given rate during daytime temperatures. During nighttime temperatures, however, heat may be released back into the attic from the blanket at a faster rate than the absorption (see 555).

Further facilitating heat removal, another temperature modulating blanket may be installed at an elevated vent in the facility to promote circulation as hot air from this blanket exits through the vent as indicated at 595. In conjunction with this convective flow, the released heat from the ceiling blanket may also be circulated away as noted at 575 to further promote recharge of the ceiling blanket for use during the next day. Of course, this vent and any others may be closed off in winter months where such circulation is ultimately less helpful in modulating temperature of the storage space.

Embodiments described hereinabove include a reflective temperature modulating blanket and techniques for use that allow for substantial modulation of temperature within a storage space of a structural facility without the requirement of full HVAC capacity. So, for example, the facility may be left without any air conditioning or even power without undue concern over temperatures in the storage space exceeding a predetermined threshold even in summer months and in warmer climates. This may be achieved through a unique reflective and thermally conductive layer of the blanket. Unique solar circulation techniques may further assure that such temperature thresholds are not exceeded.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

I claim:

1. A temperature modulating blanket system for incorporation into a structural facility, the system to modulate facility temperature and comprising:
    a first temperature modulating blanket at a ceiling below an attic and housing a first phase change material with a first predetermined melting range; and
    a second temperature modulating blanket at a vent of a roof over the attic and housing a second phase change material with a second predetermined melting range higher than the melting range of the first phase change material.

2. The temperature modulating blanket of claim 1 wherein the melting range of the first phase change material includes a melting point between 60° F. and 85° F.

3. The temperature modulating blanket of claim 2 wherein the phase change materials include one of calcium chloride hexahydrate, sodium sulfate, paraffin, coconut oil, $NaA_2SO_4 \cdot 10H_2O$, $CACl_2 6H_2O$, $Na_2S_2O_3 \cdot 5H_2O$, $NaCO_3 \cdot 10H_2O$ and $NaHPO_4 \cdot 12H_2O$.

4. A structural facility comprising:
    a high elevation vent in a roof defining an attic therebelow, the high elevation vent accommodating a phase change material assembly for storing heat during daylight and releasing heat at night; and
    a low elevation vent to accommodate a flow of air into the attic, the releasing to encourage circulation of the air from the low elevation vent to the high elevation vent.

5. The structural facility of claim 4 wherein the high elevation vent is one of a stack vent and a ridge vent.

6. A method of modulating temperature in a structural facility with a roof comprising lower and higher elevation vents and a ceiling below the roof separating an attic space above from an adjacent space below, the method comprising:
    positioning a first temperature modulating blanket at the ceiling, the blanket having a reflective material layer in air-free conductive thermal communication with a phase change material of a predetermined melting range accommodated by the blanket;
    reflecting radiation away from the phase change material and into the attic with the reflective material layer during daylight;
    facilitating a greater rate of heat conduction out of the phase change material and into the attic with the reflective material layer at night than into the phase change material from the attic with the reflective material layer during daylight; and
    facilitating circulation of air to the higher elevation vent at night with a second temperature modulating blanket thereat, the second temperature modulating blanket having a second phase change material with a higher melting range than that of the first phase change material.

7. The method of claim 6 further comprising:
    absorbing heat from the attic space with the phase change material during daylight; and
    releasing heat from the phase change material into the attic space at night.

8. The method of claim 7 wherein the absorbing of the heat from the attic space prevents the heat from reaching the adjacent space.

9. The method of claim 7 wherein the releasing of the heat from the phase change material at the ceiling during night is subject to a resistance value that is substantially below that displayed during the absorbing of the heat into the phase change material at the ceiling during the daylight.

10. A structural facility comprising:
    a roof with lower and higher elevation vents;
    a ceiling below the roof defining an attic space there above and an adjacent space there below;
    a first temperature modulating blanket located at the ceiling with a first phase change material of the blanket having a predetermined melting range; and
    a second temperature modulating blanket at the higher elevation vent and having a second phase change material with a higher melting range than that of the first phase change material.

11. The structural facility of claim 10 wherein the facility is a storage unit.

12. The structural facility of claim 10 further comprising a wall with a temperature modulating blanket accommodating phase change material therein.

* * * * *